(12) United States Patent
Hu et al.

(10) Patent No.: US 8,929,254 B2
(45) Date of Patent: Jan. 6, 2015

(54) SYSTEMS AND METHODS FOR CONSTRAINED FORWARDING BASED PACKET NETWORK CONNECTIVITY

(71) Applicant: Ciena Corporation, Hanover, MD (US)

(72) Inventors: Jie Hu, Santa Rosa, CA (US); Raghuraman Ranganathan, Bellaire, TX (US); David Gilson, Honolulu, HI (US)

(73) Assignee: Ciena Corporation, Hanover, MD (US)

(*) Notice: Subject to any disclaimer, the term of this patent is extended or adjusted under 35 U.S.C. 154(b) by 141 days.

(21) Appl. No.: 13/664,003

(22) Filed: Oct. 30, 2012

(65) Prior Publication Data

US 2014/0119239 A1 May 1, 2014

(51) Int. Cl.
*H04L 12/56* (2006.01)

(52) U.S. Cl.
USPC .......................................................... 370/256

(58) Field of Classification Search
CPC ........ H04L 45/48; H04L 12/462; H04L 45/02
USPC .................................................. 370/256, 408
See application file for complete search history.

(56) References Cited

U.S. PATENT DOCUMENTS

| | | | |
|---|---|---|---|
| 6,085,238 A * | 7/2000 | Yuasa et al. ..................... 709/223 |
| 6,188,694 B1 * | 2/2001 | Fine et al. ....................... 370/402 |
| 7,653,056 B1 | 1/2010 | Dianes et al. |
| 7,653,057 B1 | 1/2010 | Fromm et al. |
| 7,773,541 B2 | 8/2010 | Davison et al. |
| 7,778,201 B2 | 8/2010 | Daines et al. |
| 7,808,992 B2 * | 10/2010 | Homchaudhuri et al. ..... 370/392 |
| 7,835,297 B2 | 11/2010 | Daines et al. |
| 7,835,379 B2 | 11/2010 | Dravida et al. |
| 7,869,439 B1 | 1/2011 | Ramberg et al. |
| 7,961,728 B2 | 6/2011 | Daines et al. |
| 8,036,106 B1 | 10/2011 | Hu et al. |
| 8,218,445 B2 | 7/2012 | Katz et al. |
| 8,218,540 B1 | 7/2012 | Busch et al. |
| 8,369,344 B1 * | 2/2013 | Krishnan et al. ......... 370/395.53 |
| 8,467,375 B2 * | 6/2013 | Blair ............................. 370/351 |
| 8,483,046 B2 * | 7/2013 | DeCusatis ..................... 370/217 |
| 8,495,217 B2 * | 7/2013 | Cyr et al. ....................... 709/226 |
| 8,537,810 B2 * | 9/2013 | Sinicrope ..................... 370/352 |

(Continued)

OTHER PUBLICATIONS

Internet Engineering Task Force, Request for Comments: 4762, Virtual Private LAN service (VPLS) Using Label Distribution Protocol (LDP) Signaling, Jan. 2007.*

(Continued)

*Primary Examiner* — Melvin Marcelo
*Assistant Examiner* — Peter Solinsky
(74) *Attorney, Agent, or Firm* — Clements Bernard PLLC; Christopher L. Bernard; Lawrence A. Baratta, Jr.

(57) ABSTRACT

An Ethernet Tree (E-Tree) service is described instantiated on an Ethernet switch and in an Ethernet network. The E-Tree service is implemented using Private Forwarding Groups (PFGs), asymmetric Virtual Local Area Networks (VLANs), virtual switches, and port configurations. The use of PFGs in addition to asymmetric VLANs provides higher levels of security in the described E-Tree systems and methods. The E-Tree systems and methods also can utilize Access Control Lists (ACLs) at Network-Network Interfaces (NNIs) for controlling unknown unicasts from reaching wrong ports. The E-Tree systems and methods can also seamlessly interoperate with packet switches using an IEEE 802.1Q-2011 approach.

20 Claims, 8 Drawing Sheets

(56) References Cited

U.S. PATENT DOCUMENTS

| | | | |
|---|---|---|---|
| 2007/0260910 A1* | 11/2007 | Jain et al. | 714/4 |
| 2011/0164617 A1* | 7/2011 | Yong | 370/392 |
| 2012/0147893 A1* | 6/2012 | Shabtay et al. | 370/395.53 |
| 2012/0300784 A1* | 11/2012 | Jiang | 370/395.53 |
| 2013/0051400 A1* | 2/2013 | Fomin et al. | 370/402 |
| 2014/0003423 A1* | 1/2014 | Assarpour et al. | 370/389 |
| 2014/0098669 A1* | 4/2014 | Garg et al. | 370/235 |
| 2014/0129728 A1* | 5/2014 | Alex et al. | 709/228 |
| 2014/0233423 A1* | 8/2014 | Jha et al. | 370/254 |

OTHER PUBLICATIONS

Delord, Simon; Key, Raymond; Jounay, Frederic; MEF E-Tree Service Over MPLS Needs, Myths and Challenges, Ethernet Academy Articles, Jun. 16, 2010.*

IEEE Standards Association; "Media Access Control (MAC) Bridges and Virtual Bridge Local Area Networks"; IEEE Std 802.1Q-2011, Aug. 31, 2011.

MEF Ethernet Services; "Carrier Ethernet Services Overview Presentation"; Aug. 2008.

MEF Technical Specification MEF 6.1; Ethernet Services Definitions—Phase 2, Apr. 2008—MEF 6.1 (C) The Metro Ethernet Forum 2008. All Right Reserved.

MEF Technical Specification MEF 10.2—Ethernet Services Attributes Phase 2; Oct. 27, 2009—MEF 10.2 (C) The Metro Ethernet Forum 2009. All Rights Reserved.

MEF Technical Specification MEF 26.1; External Network Network Interface (ENNI)—Phase 2—Jan. 2012; MEF 26.1 (C) The Metro Ethernet Forum 2012.

* cited by examiner

SYSTEMS AND METHODS FOR CONSTRAINED FORWARDING BASED PACKET NETWORK CONNECTIVITY

FIELD OF THE INVENTION

Generally, the field of art of the present disclosure pertains to Ethernet systems and methods, and more particularly, to Carrier Ethernet systems and methods with constrained forwarding between endpoints of a service using Private Forwarding Groups (PFGs).

BACKGROUND OF THE INVENTION

The Metro Ethernet Forum (MEF, metroethernetforum.org) is an alliance defining technical specifications and implementation agreements to promote interoperability and deployment of Carrier Ethernet worldwide. Exemplary technical specifications include MEF 6.1, Ethernet Services Definitions, Phase 2, April 2008; MEF 10.2, Ethernet Services Attributes Phase 2, October 2009; and MEF 26.1, External Network Network Interface (ENNI)—Phase 2, January 2012; the contents of each is incorporated by reference herein. Ethernet Tree (E-Tree) is a MEF service construct (defined in MEF 6.1) using a Rooted-Multipoint Ethernet Virtual Circuit type (defined in MEF 10.2). An E-Tree service, associating Root (R) and Leaf (L) User-Network Interfaces (UNIs) (defined in MEF 10.2), can be supported across a single Carrier Ethernet Network (CEN) [reference: MEF 6.1] or multiple CENs [reference: MEF 26.1]. The key behavior of the E-Tree service is to allow an ingress frame at a Root UNI to egress at other Root and Leaf UNIs but to restrict an ingress frame at a Leaf UNI to egress only at Root UNIs. Furthermore, there can be more than one Root UNI in a service. A given Network Element (NE) in a CEN could have more than one Root UNI and/or more than one Leaf UNIs as well has having these on different hardware (e.g., line cards, etc.). Exemplary applications of E-Tree include, without limitation, broadcast/multicast video, IEEE 1588 PTP clock synchronization, mobile backhaul, Internet access, hub and spoke virtual private network, and the like. This implementation is not restricted to only an E-Tree type connectivity and any connectivity across a network that need constrained forwarding between all or subset of the UNIs as service endpoints is applicable.

A conventional implementation of E-Trees is defined in Annex F of IEEE 802.1Q-2011, "Media Access Control (MAC) Bridges and Virtual Bridge Local Area Networks," using Asymmetric Virtual Local Area Networks (VLANs). A few key aspects of this approach include using different 'Trunk' VLANs (hence, asymmetric) to identify traffic ingressing at a Root UNI versus at a Leaf UNI and using additional configurations such as VLAN member sets to restrict the forwarding domain. The Internet Engineering Task Force (IETF) has also ongoing work to support E-Tree across Virtual Private LAN Service (VPLS) networks. There are some disadvantages with this conventional approach such as shared VLAN learning could cause an unknown unicast to be flooded to all UNIs and in-depth port configuration requirements such as VLAN member sets and static VLAN registrations that require additional configurations. Further, not all switch platforms may support asymmetric VLANs. Also, all broadcast/multicast traffic is forwarded through the network, including the leaf to leaf traffic which is dropped by the devices having the egressing UNIs right before they reach the UNIs. Additional complications might also be present in handling of IEEE-802.1Q-2011 Connectivity Fault Management (CFM) frames in these services. That said, with the IEEE 802.1Q-2011, the network bandwidth can be wasted.

Thus, a different approach to support any constrained forwarding based connectivity is desired. In the specific example of an E-Tree service, any such approach must meet the service delivery requirements of E-Tree including port based EP-Tree and VLAN based EVP-Tree, be interoperable with the IEEE 802.1Q-2011 approach, support greater than one Root and/or greater than one Leaf on the same node, and allow a same UNI to be a Root in one E-Tree instance while be a Leaf on another E-Tree instance at that UNI.

BRIEF SUMMARY OF THE INVENTION

In an exemplary embodiment, an Ethernet switch includes a virtual switch including a logical partition of a physical switch; and an Ethernet Tree (E-Tree) service instantiated via the virtual switch through a first private forwarding group and a second private forwarding group, wherein each of the first private forwarding group and the second private forwarding group includes a set of group-based associations and forwarding rules among logical interfaces of the virtual switch; wherein Root User-Network Interface (UNI) ports are associated with the first private forwarding group on the Ethernet switch belonging to a particular service instance and Leaf UNI port are associated with the second private forwarding group on the Ethernet switch belonging to the particular service instance; wherein the first private forwarding group is configured to forward packets received on any of the Root UNI ports to any other Root UNI ports connected to the first private forwarding group and to the second private forwarding group for forwarding to any Leaf UNI ports connected to the second private forwarding group; and wherein the second private forwarding group is configured to forward packets on any of the Leaf UNI ports to the first private forwarding group for forwarding to any Root UNI ports connected to the first private forwarding group. The Ethernet switch can further include a Network-Network Interface (NNI) port connected to the virtual switch; a Root Virtual Local Area Network (VLAN) on the NNI port connected to the first private forwarding group; and a Leaf VLAN on the NNI port connected to the second private forwarding group.

The first private forwarding group can be configured to forward packets received on any of the Root UNI ports to the Root VLAN on the NNI port; and wherein the second private forwarding group can be configured to forward packets received on any of the Leaf UNI ports to the Leaf VLAN. The first private forwarding group can be configured to forward packets received on the Root VLAN to any of the Root UNI ports and to the second private forwarding group for forwarding to any of the Leaf UNI ports connected to the second private forwarding group; and wherein the second private forwarding group can be configured to forward packets received on the Leaf VLAN to the first private forwarding group for forwarding to any of the Root UNI ports. The Ethernet switch can further include an Access Control List for the NNI port associated with each of the Root VLAN and the Leaf VLAN; wherein, based on the Access Control List, the Root VLAN allows a packet if its associated source address is of customer equipment at a Root UNI. Based on the Access Control List, the Leaf VLAN can deny a packet if it's associated source address is of customer equipment at a Root UNI. The virtual switch can be configured for one of shared VLAN learning and control plane techniques for establishing forwarding tables on each of the Root VLAN and the Leaf VLAN.

The virtual switch can be configured to push a Service VLAN identifier of the Root VLAN on a packet when the packet is ingressing at a Root UNI port; push a Service VLAN identifier of the Leaf VLAN on a packet when the packet is ingressing at a Leaf UNI port; pop a Service VLAN identifier of the Root VLAN or the Leaf VLAN on a packet when the packet is egressing at a Root UNI port; and pop a Service VLAN identifier of the Root VLAN on a packet when the packet is egressing at a Leaf UNI port. The virtual switch can be configured to communicate with a second Ethernet switch via the Root VLAN and the Leaf VLAN, wherein the second Ethernet switch operates the E-Tree service in accordance with IEEE 802.1Q-2011. The first private forwarding group and the second private forwarding group can be each implemented in hardware of the physical switch via network processor code. The Ethernet switch can further include at least two of the Root UNI ports are located on different hardware in the Ethernet switch but commonly attached to the first private forwarding group.

In another exemplary embodiment, an Ethernet network with an Ethernet Tree (E-Tree) service includes a plurality of virtual switches interconnected to one another via Network-Network Interface (NNI) ports, wherein each of the plurality of virtual switches includes a logical partition of a physical switch, wherein each of the plurality of virtual switches includes a first private forwarding group and a second private forwarding group, and wherein each of the first private forwarding group and the second private forwarding group includes a set of group-based associations and forwarding rules among logical interfaces of the associated virtual switch; at least one Root User-Network Interface (UNI) port connected to the first private forwarding group of one of the plurality of virtual switches belonging to a particular service instance; and at least one Leaf UNI port connected to the second private forwarding group of one of the plurality of virtual switches belonging to the particular service instance; wherein the first private forwarding group is configured to forward packets received on any of the at least one Root UNI port to any other Root UNI port connected to the first private forwarding group and to the associated second private forwarding group for forwarding to any Leaf UNI ports connected to the second private forwarding group; and wherein the second private forwarding group is configured to forward packets on received on any of the at least one Leaf UNI ports to the associated first private forwarding group for forwarding to any Root UNI ports connected to the first private forwarding group.

The Ethernet network can further include a Root Virtual Local Area Network (VLAN) connecting the first private forwarding groups of each of the plurality of switches therebetween; and a Leaf VLAN connecting the second private forwarding groups of each of the plurality of switches therebetween. For each of the plurality of virtual switches, the first private forwarding group can be configured to forward packets received on any Root UNI port to the Root VLAN; and wherein, for each of the plurality of virtual switches, the second private forwarding group can be configured to forward packets received on any Leaf UNI port to the Leaf VLAN. For each of the plurality of virtual switches, the first private forwarding group can be configured to forward packets received on the Root VLAN to any Root UNI port connected thereto and to the associated second private forwarding group for forwarding to any Leaf UNI port connected to the associated second private forwarding group; and wherein, for each of the plurality of virtual switches, the second private forwarding group can be configured to forward packets received on the Leaf VLAN to the associated first private forwarding group for forwarding to any Root UNI ports connected thereto.

The Ethernet network can further include an Access Control List associated with each of the Root VLAN and the Leaf VLAN; wherein, based on the Access Control List, the Root VLAN can allow a packet if its associated source address is of customer equipment at a Root UNI; and wherein, based on the Access Control List, the Leaf VLAN can deny a packet if its associated source address is of customer equipment at a Root UNI. Each of the plurality of virtual switches can be configured for shared VLAN learning and control plane techniques for establishing forwarding tables on each of the Root VLAN and the Leaf VLAN. Each of the plurality of virtual switches can be configured to push a Service VLAN identifier of the Root VLAN on a packet when the packet is ingressing at a Root UNI port; push a Service VLAN identifier of the Leaf VLAN on a packet when the packet is ingressing at a Leaf UNI port; pop a Service VLAN identifier of the Root VLAN or the Leaf VLAN on a packet when the packet is egressing at a Root UNI port; and pop a Service VLAN identifier of the Root VLAN on a packet when the packet is egressing at a Leaf UNI port. The Ethernet network can further include an Ethernet node communicatively coupled to the plurality of virtual switches via the Root VLAN and the Leaf VLAN, wherein the Ethernet node operates the E-Tree service in accordance with IEEE 802.1Q-2011.

In yet another exemplary embodiment, a method includes receiving a first packet from a Root User-Network Interface (UNI) port at a first private forwarding group of a virtual switch; sending the first packet to any additional Root UNI ports coupled to the first private forwarding group and to a second private forwarding group; sending the first packet from the second private forwarding group to any Leaf UNI ports coupled to the second private forwarding group; sending the first packet to a Root Virtual Local Area Network (VLAN); receiving a second packet from a Leaf UNI port at the second private forwarding group of the virtual switch; sending the second packet from the second private forwarding group of the virtual switch to the first private forwarding group; sending the second packet from the first private forwarding group to the Root UNI port at the first private forwarding group and to the any additional Root UNI ports coupled to the first private forwarding group; and sending the second packet to a Leaf VLAN.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, E-Tree systems and methods are described using Private Forwarding Groups (PFGs), asymmetric VLANs for interoperability, virtual switches, and port configurations. The use of PFGs in addition to asymmetric VLANs provides higher levels of security in the E-Tree systems and methods. The E-Tree systems and methods also can utilize Access Control Lists (ACLs) at Network-Network Interfaces (NNIs) for controlling unknown unicasts from reaching wrong ports. The E-Tree systems and methods can also seamlessly interoperate with packet switches using the IEEE 802.1Q-2011 approach. Furthermore, the E-Tree systems and methods offer flexibility in provisioning using templates and the like.

Figure 1:
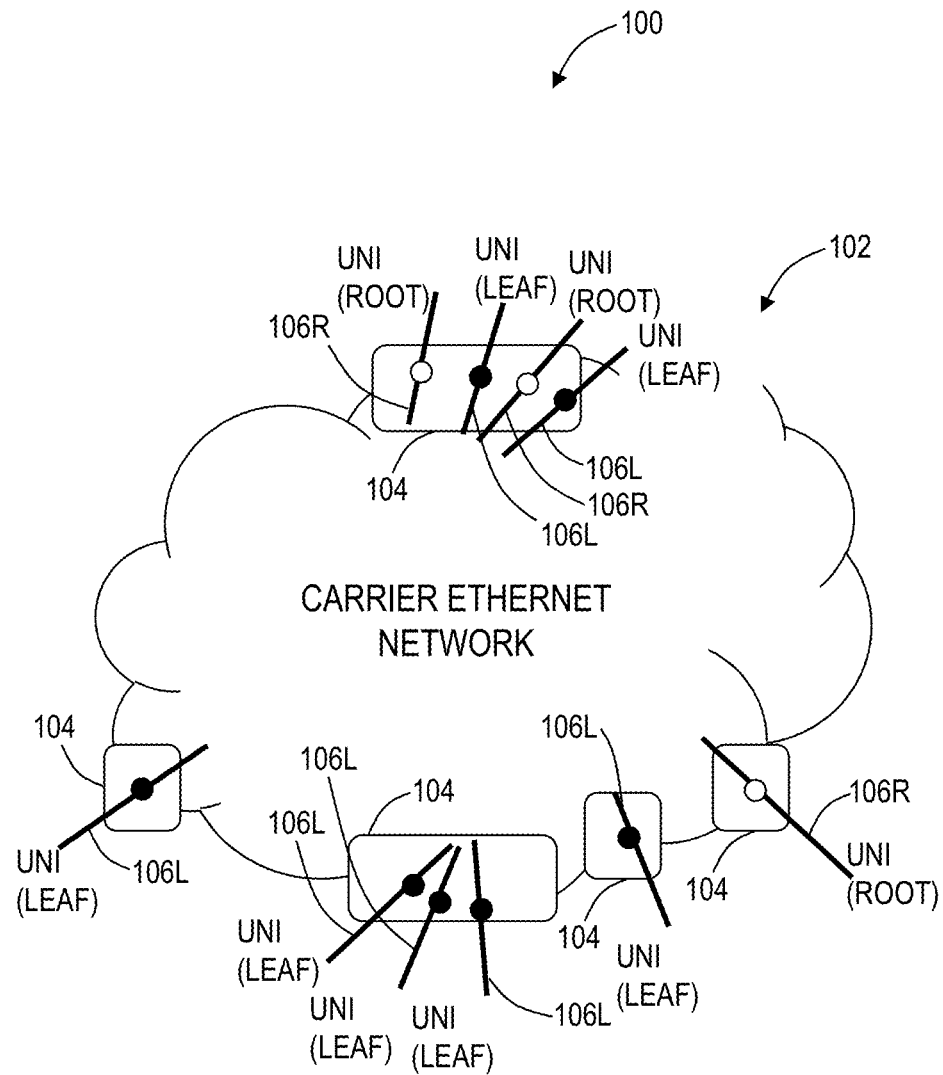
FIG. 1 is a network diagram of a Carrier Ethernet network with an E-Tree service instantiated thereon.

Referring to FIG. 1, in an exemplary embodiment, a network diagram illustrates a Carrier Ethernet network 100 with an E-Tree service 102 instantiated thereon. The Carrier Ethernet network 100 is depicted as a cloud with various nodes 104 interconnected to one another (via the cloud). While not shown, those of ordinary skill in the art will recognize the nodes 104 can be connected to one another via NNI ports thought various means known in the art, optical, wireless, etc. Each of the nodes 104 can include one or more UNI ports 106 that are each designated as a Root (R) or Leaf (L) for the E-Tree service 102. The nodes 102 can be, without limitation, packet switches, Ethernet switches, optical switches, multi-service switches, aggregation switches, etc. The E-Tree service 102 provides traffic separation between users with traffic from any of the Leaf ports 106L being allowed to arrive at one of more of the Root ports 106R but never being transmitted to other Leaf ports 106L. Generally, the E-Tree service 102 is targeted at multi-host and where user traffic must be kept invisible to other users.

The E-Tree service 102 can include Ethernet Virtual Connections (EVCs) as defined in MEF 10.2 which are service containers connecting two or more of the nodes 102 and associating with various UNI ports 106 on the nodes. The EVCs can be used to prevent data transfer between nodes and/or ports which do not belong to the EVC. From an implementation perspective, the E-Tree service 102 can require an EVC with one or more Root UNI port 106R on a same node 102 and one or more Leaf UNI port 106L on a same node 102. Further, the E-Tree service 102 should be able to have the Root or Leaf designation on a per EVC basis at each port 102. For example, a particular UNI port 106 may be a Root for one EVC but a Leaf for another EVC if using VLAN-based services.

Figure 2:
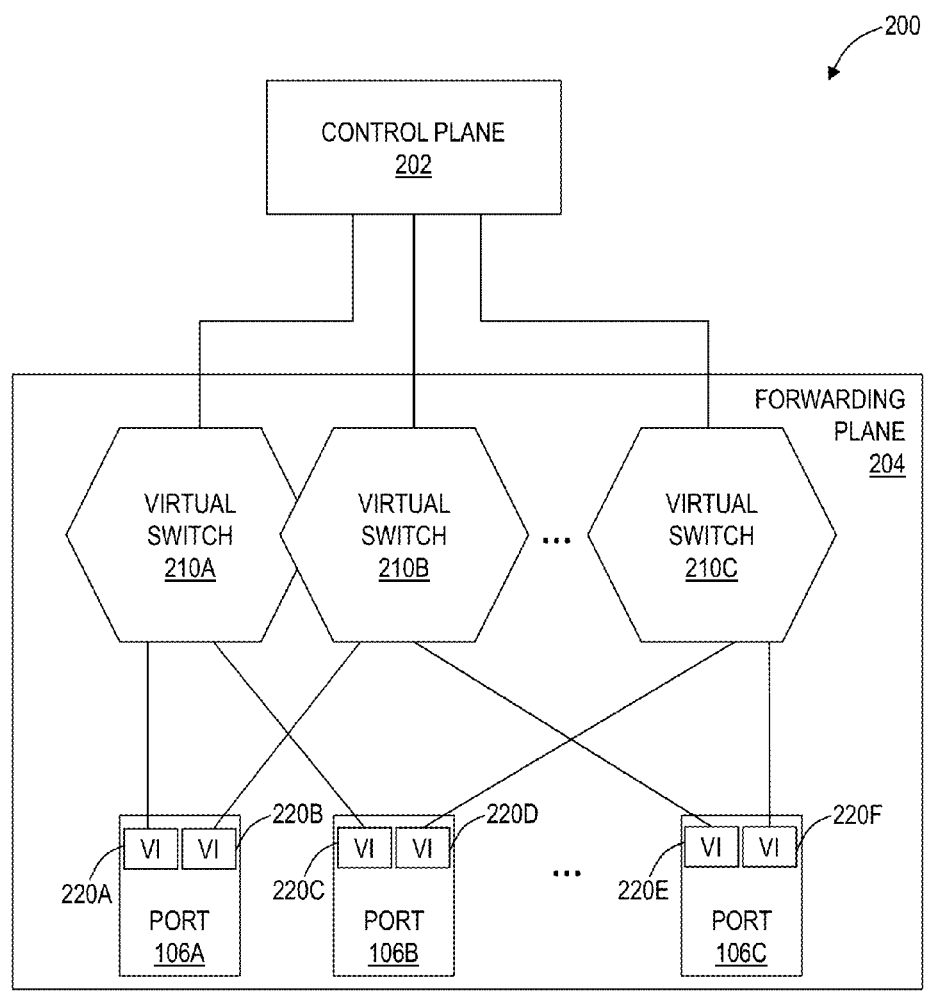
FIG. 2 is a block diagram illustrates an Ethernet switch for implementation of nodes and an E-Tree service.

Referring to FIG. 2, in an exemplary embodiment, a block diagram illustrates an Ethernet switch 200 for implementation of the nodes 104 and the E-Tree service 102. It should be appreciated by those of ordinary skill in the art that FIG. 2 depicts the Ethernet switch 200 in an oversimplified manner, and a practical embodiment may include additional components and suitably configured processing logic to support known or conventional operating features that are not described in detail herein. The switch 200 includes a control plane 202 and a forwarding plane 204. The forwarding plane 204 can forward a packet received on one port 106A to one or more other ports 106B, 106C based at least on a destination address of the packet. The control plane 204 can receive and process control packets for processing thereof. Exemplary control packets include, without limitation, IGMP packets, CFMPDUs, ITU-T Y.1731 Ethernet OAM packets, IEEE 802.1aq Shortest Path Bridging (SPB) or similar packets, etc.

The forwarding plane 204 can include virtual switches 210A, 210B, 210C communicatively coupled to the control plane 202 and the ports 106A, 106B, 106C. Collectively, the control plane 202 and the forwarding plane 204 are realized in a combination of hardware and other processing logic (e.g., application specific integrated circuits (ASICs), field programmable gate arrays (FPGAs) and other electrical circuitry), firmware, and/or software. That is, the control plane 202 and the forwarding plane 204 and the associated Ethernet switch 200 is a physical device. Alternatively, the control plane for path set up including the forwarding table can be centralized controller. So, the instantiation of a controller can be a separate device from that of the Ethernet switch. There might be a management or Openflow like interface to enable the switch to interact with such a controller. The virtual switches 210A, 210B, 210C represent a logical partition of the physical Ethernet switch 200 into separate switching domains; each of the virtual switches 210A, 210B, 210C forwards traffic independently of the others, providing a unique mechanism for isolating user traffic that is superior to other available techniques.

The virtual switches 210A, 210B, 210C connect to the ports 106A, 106B, 106C via virtual interfaces 220A, 220B, 220C, 220D, 220E, 220F. The virtual interfaces 220 can also be referred to as subports of the ports 106. Also, the Root UNI ports 106R and the Leaf UNI ports 106L could have one or more subports, and subsets of traffic can be classified based on any header info to any subport, some subports could be attached as virtual interfaces 220 to a particular virtual switch 210A, 210B, 210C while other subports could be attached to other virtual switches 210A, 210B, 210C. In the example of FIG. 2, the Ethernet switch 200 illustrates the virtual switch 210A connected to the ports 106A, 106B via the virtual interfaces 220A, 220C, the virtual switch 210B connected to the ports 106A, 106B via the virtual interfaces 220B, 220E, and the virtual switch 210C connected to the ports 106B, 106C via the virtual interfaces 220D, 220F. Of course, other configurations are also contemplated on the Ethernet switch 200. The forwarding plane 206 may select a destination virtual interface 220A, 220B, 220C, 220D, 220E, 220F for a packet based on all or portions of the forwarding information of the packet using known forwarding techniques. For example, the forwarding plane 206 can use a learned address table, static address table, or control plane based table associated with virtual switch 210A, 210B, 210C to determine to which of the virtual interfaces 220A, 220B, 220C, 220D, 220E, 220F the received packet should be forwarded. Of note, the Ethernet switch 200 is presented for illustration purposes, and those of ordinary skill in the art will recognize the Carrier Ethernet systems and methods described herein contemplate other types of network elements and other implementations.

Figure 3:
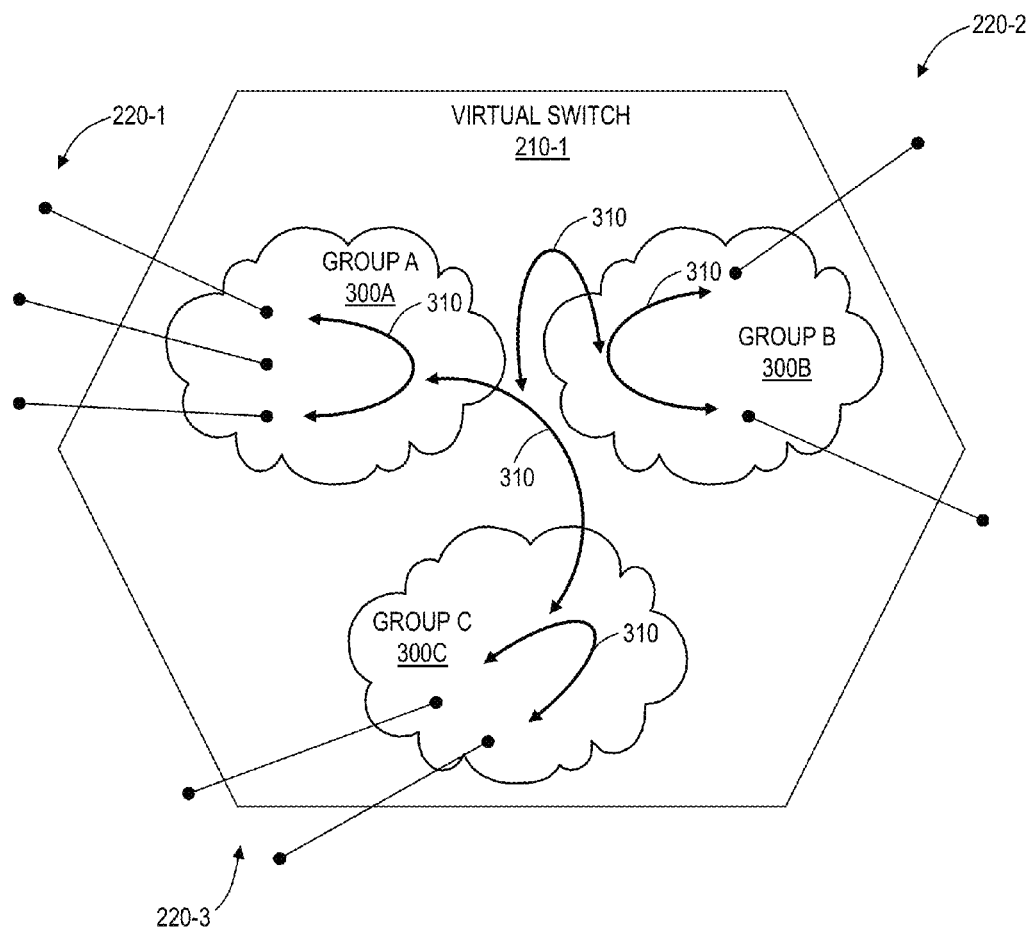
FIG. 3 is a logical diagram of an exemplary virtual switch with Private Forwarding Groups (PFGs)

Referring to FIG. 3, in an exemplary embodiment, a logical diagram illustrates an exemplary virtual switch 210-1 with Private Forwarding Groups (PFGs) 300. This exemplary embodiment includes three PFGs 300A, 300B, 300C associated with virtual interfaces 220-1, 220-2, 220-3, respectively, of the virtual switch 210-1. The purpose of the PFGs 300A, 300B, 300C is to provide a set of group-based associations and forwarding rules and policies 310 (the forwarding rules and policies 310 can be generally referred to as the forwarding policies 310) among the interfaces 220-1, 220-2, 220-3 of the virtual switch 210-1. In that way, the interfaces 220-1, 220-2, 220-3 can participate in a common service domain (e.g., a virtual switch instance) and also have a level of forwarding restriction. An exemplary application of the PFGs 300A, 300B, 300C is to allow customers that belong to a common service domain (e.g., the virtual switch 210-1) to communicate up-and-down with a network facing interface (i.e., an NNI), but disallow all direct communication (at Layer 2) with other customers (i.e., UNI ports). The PFGs 300A, 300B, 300C provide an added layer definition to the flood-domain of the virtual switch 210-1.

A separate forwarding policy 310 is configured for each PFG 300A, 300B, 300C in the virtual switch 210-1. The forwarding policy 310 is used to control forwarding between the PFGs 300A, 300B, 300C. The forwarding policy 310 can be based on any combination of layer 2, layer 3 (e.g., IP address, protocol ID), layer 4 (e.g., UDP port), etc. based constructs. For example, an exemplary forwarding policy can include the PFG 300A can communicate with the PFG 300B, the PFG 300B can communicate to itself and to the PFG 300B, and the PFG 300C can communicate with the PFG 300A. The forwarding policy 310 and the PFGs 300A, 300B, 300C can limit the forwarding of all types of layer 2 frames including broadcast, multicast, unknown unicast (flood), known unicast (learned), etc. In an exemplary embodiment, the PFGs 300A, 300B, 300C are implemented in hardware such as via network processor code, and the PFGs 300A, 300B, 300C can work with other features, protocols, etc. such as IGMP, Remote Management, Connectivity Fault Management (CFM), Provider Backbone Transport (PBT) and variants thereof, etc.

Figure 4:
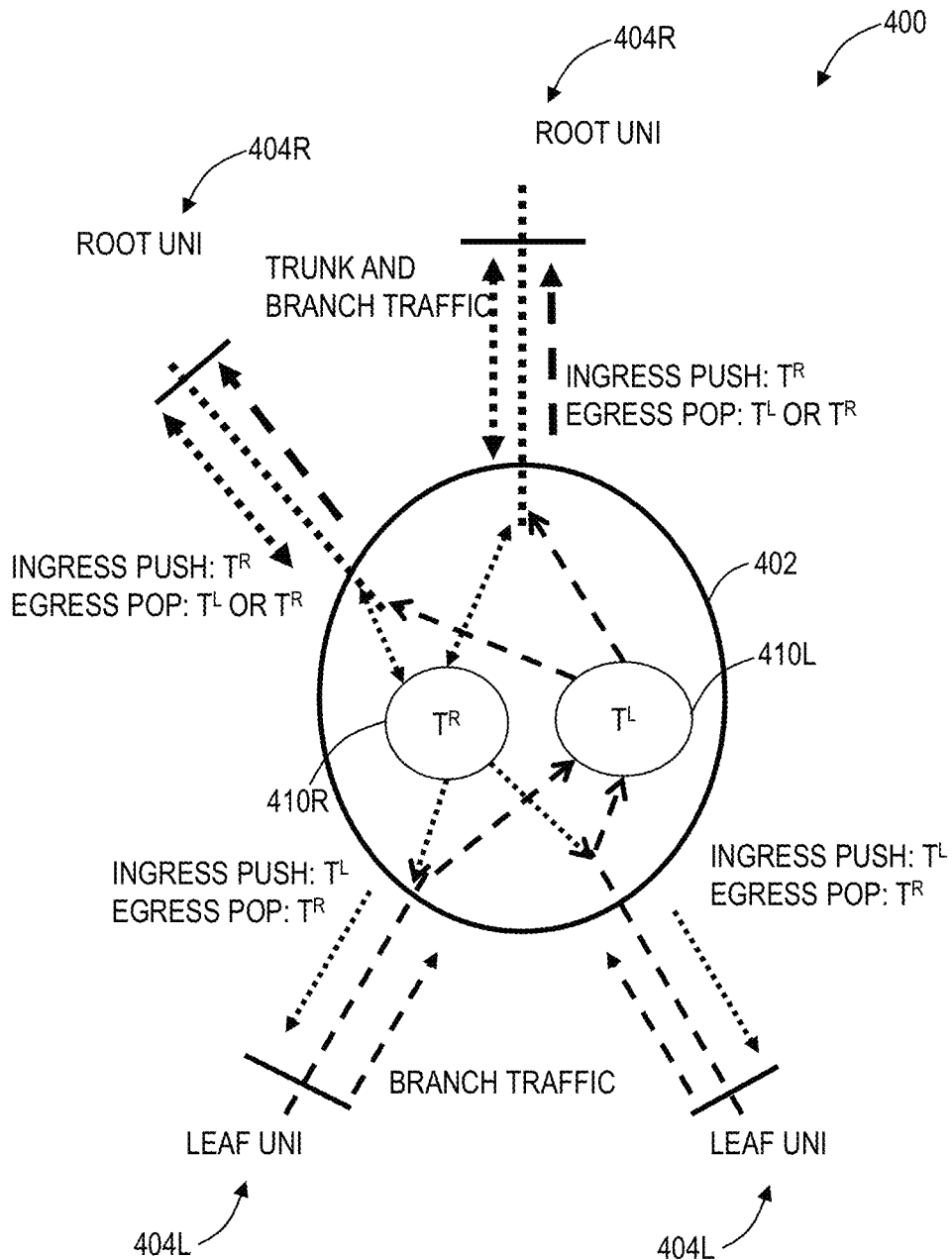
FIG. 4 is a logical diagram of forwarding rules for a node or network implementing an E-Tree service using asymmetric VLANs such as with the IEEE 802.1Q-2011 approach.

Referring to FIG. 4, in an exemplary embodiment, a logical diagram illustrates forwarding rules 400 for a node or network 402 implementing the E-Tree service 102 using asymmetric VLANs such as with the IEEE 802.1Q-2011 approach. The network 402 includes two Root UNI ports 404R and two Leaf UNI ports 404L for illustration purposes. The network 402 includes two asymmetric VLANs 410R, 410L which include a trunk VLAN, $T^R$, 410R and a branch VLAN, $T^L$, 410L. Note, the trunk VLAN 410R and the branch VLAN 410L are constructs defined in IEEE 802.1Q-2011 previously referenced herein. Members of the trunk VLAN, $T^R$, 410R includes the Root UNI ports 404R, the Leaf UNI ports 404L, and NNI ports. The trunk VLAN 410R is configured to forward from the Root UNI ports 404R to other Root UNI ports 404R, all the Leaf UNI ports 404L, and any NNI ports. Note, the NNI ports are used to reach Root UNI ports 404R and Leaf UNI ports 404L on other nodes in the network 402. Members of the branch VLAN, $T^L$, 410L include only the Root UNI ports 404R and the NNI ports. Again, the NNI ports are used to Root UNI ports 404R on other nodes in the network 402.

As packets ingress or egress the network 402, VLAN identifiers (VLAN ID) are pushed or popped based on the ports 404R, 404L. For example, a packet ingressing at one of the Root UNI ports 404R has the VLAN ID pushed on it for the trunk VLAN, $T^R$, 410R. A packet egressing at one of the Root UNI ports 404R has the VLAN ID from either the trunk VLAN, $T^R$, 410R or the branch VLAN, $T^L$, 410L popped from it. A packet ingressing at one of the Leaf UNI ports 404L has the VLAN ID pushed on it for the branch VLAN, $T^L$, 410L. Finally, a packet egressing at one of the Leaf UNI ports 404L has the VLAN ID from the trunk VLAN, $T^R$, 410R popped from it. The network 402 can include shared VLAN learning across the trunk VLAN, $T^R$, 410R and the branch VLAN, $T^L$, 410L. The network 402 can include port configurations for VLAN registration of Customer VLAN IDs (C-VID) as well as static, VLAN Member Sets and Untagged Sets, Ingress/Egress Push/Pop VLANs, etc. Generally, the network 402 instantiates the E-Tree service 102 via configuration of the VLANs 410R, 410L. Also, the VLANs 410R, 410L can be a Service VLAN (S-VID).

Figure 5:
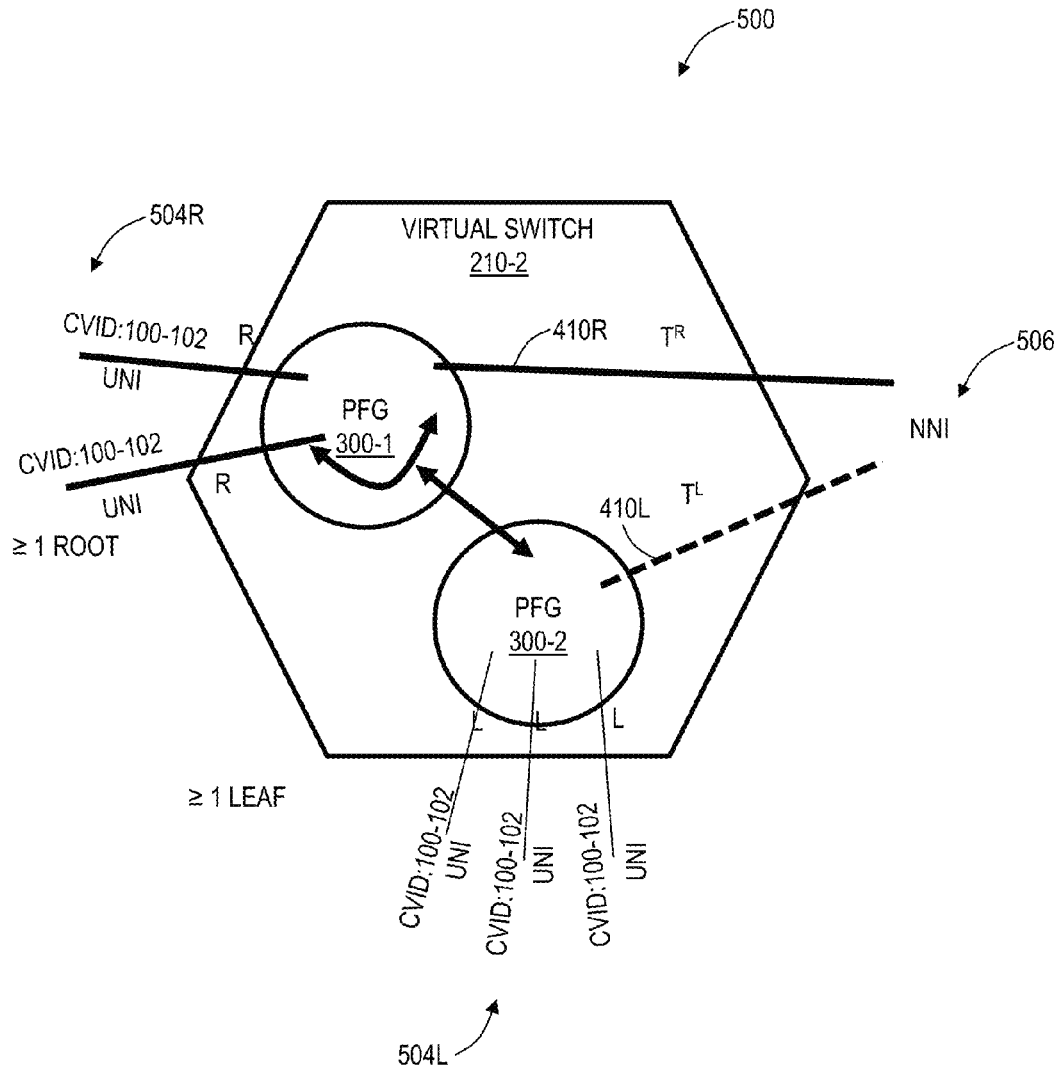
FIG. 5 is a logical diagram of an E-Tree service across an Ethernet node using a virtual switch and PFGs.

Referring to FIG. 5, in an exemplary embodiment, a logical diagram illustrates the E-Tree service 102 across an Ethernet node 500 using a virtual switch 220-2 and PFGs 300-1, 300-2. In various exemplary embodiments, the E-Tree systems and methods propose to utilize configuration of the PFGs 300-1, 300-2 and the associated forwarding policies 310 along with Access Control Lists (ACLs) to realize the E-Tree service 102. Further, the E-Tree systems and methods can also support asymmetric VLANs 410R, 410L for interoperability with the IEEE 802.1Q-2011 approach. The virtual switch 220-2 can support one or more Root UNI ports 504R and one or more Leaf UNI ports 504L. Additionally, the virtual switch 220-2 can support the asymmetric VLANs 410R, 410L via NNI ports 506 for interoperability. For illustration purposes, the Ethernet node 500 is illustrated with an example EVC service with three customer VLAN IDs (CVIDS 100-102).

Within the Ethernet node 500, the Root UNI ports 504R must be attached to a same PFG 300-1 and the Leaf UNI ports 504L must be attached to a same PFG 300-2. To realize the E-Tree service 102, there can be three general categories of forwarding rules for the virtual switch 220-2, namely PFG-based rules, VLAN-based rules, and ACL-based rules. The PFG-based rules include, for the PFG 300-1, allowing any packet from the Root UNI ports 504R to be sent to any Root UNI ports 504R within the PFG 300-1, and, for the PFG 300-2, allowing any packet from the Leaf UNI ports 504L only to/from the PFG 300-1. That is, the PFG rules include enabling any packet from the Root UNI ports 504R to be sent to all members of the PFGs 300-1, 300-2 and packets to/from the PFG 300-2 only to/from the PFG 300-2. The PFG rules instantiate the Root and Leaf restrictions of the E-Tree service 102 in the virtual switch 210-2.

The VLAN-based rules enable interoperability with nodes using asymmetric VLANs to create the E-Tree service 102. The VLAN-based rules also enable NNI port 504 connectivity between virtual switches. The PFG 300-1 is connected to the NNI port 506 for receiving the trunk VLAN, $T^R$, 410R and the PFG 300-2 is connected to the NNI port 506 for receiving the branch VLAN, $T^L$, 410L. The VLAN-based rules are similar to as described in the forwarding rules 400. Specifically, for the VLANs 410R, 410L, the rules include for ingress of a packet on the Root UNI ports 504R, push S-VID ($T^R$); for ingress of a packet on the Leaf UNI ports 504L, push S-VID ($T^L$); for egress of a packet on the Root UNI ports 504R, pop S-VID ($T^R$ or $T^L$); and for egress of a packet on the Leaf UNI ports 504L, pop S-VID ($T^R$).

The ACL-based rules operate on the NNI ports 506 and focus on ingress packets on the NNI ports 506. On the VLAN 410R, the ACL-based rules allow packets if their source address (SA) of the customer equipment (CE) is at a Root UNI port. On the VLAN 410L, the ACL-based rules deny packets if their source address (SA) of the customer equipment (CE) is at a Root UNI port. Because the PFG 300-2 is for Leafs and it allows packets to/from the PFG 300-1 only, a packet compliant to the ACL on the NNI (via the VLAN 410L) will be sent only to the PFG 300-1, not to any Leaf UNI ports 504L in the PFG 300-2. Additionally, the node 500 includes shared VLAN learning, i.e. on all S-VIDs in the virtual switch 210-2, unknown destination addresses (DAs) will be broadcast on both the S-VIDs 410L, 410R, and the MAC address of customer equipment is known at the Root UNI ports 504R.

Based on the IEEE 802.1Q asynchronous VLAN model, all broadcast/multicast traffic is forwarded through the network, including the leaf to leaf traffic which is dropped by the devices having the egressing UNIs right before they reach the UNIs. Specifically, the E-Tree systems and methods are able to not forward leaf to leaf traffic to an NNI if the NNI does not lead to any root UNIs. This is where the ACL-based rules apply. This is because of the E-Tree systems and methods are configured with network knowledge, such as via the ACL-based rules. Advantageously, the E-Tree systems and methods can stop forwarding unnecessary traffic as early as possible conserve overall network traffic. A simple example could be for single root E-Tree, there would not be any trunk VLAN needed, or there would not be any interfaces attaching to the trunk VLAN. Another example for a NNI only (for transit the E-Tree traffic), if an NNI does not lead to any root UNIs, there would not be any interface of that NNI attaching to the primary private forwarding group.

For reference, the following table summarizes the aforementioned rules for the E-Tree service 102 across the Ethernet node 500 by showing who is allowed egress for a given ingress:

| Allowed Egress for given Ingress | | | | | |
|---|---|---|---|---|---|
| | | Ingress End Point Role | | | |
| | | Root | Leaf | Trunk (Leaf S-VID) | Trunk (Root S-VID) |
| Egress End Point Role | Root | ☑ | ☑ | ☑ | ☑ |
| | Leaf | ☑ | ☐ | ☐ | ☑ |
| | Trunk (Leaf S-VID) | ☐ | ☑ | ☑ | ☐ |
| | Trunk (Root S-VID) | ☑ | ☐ | ☐ | ☑ |

Figure 6:
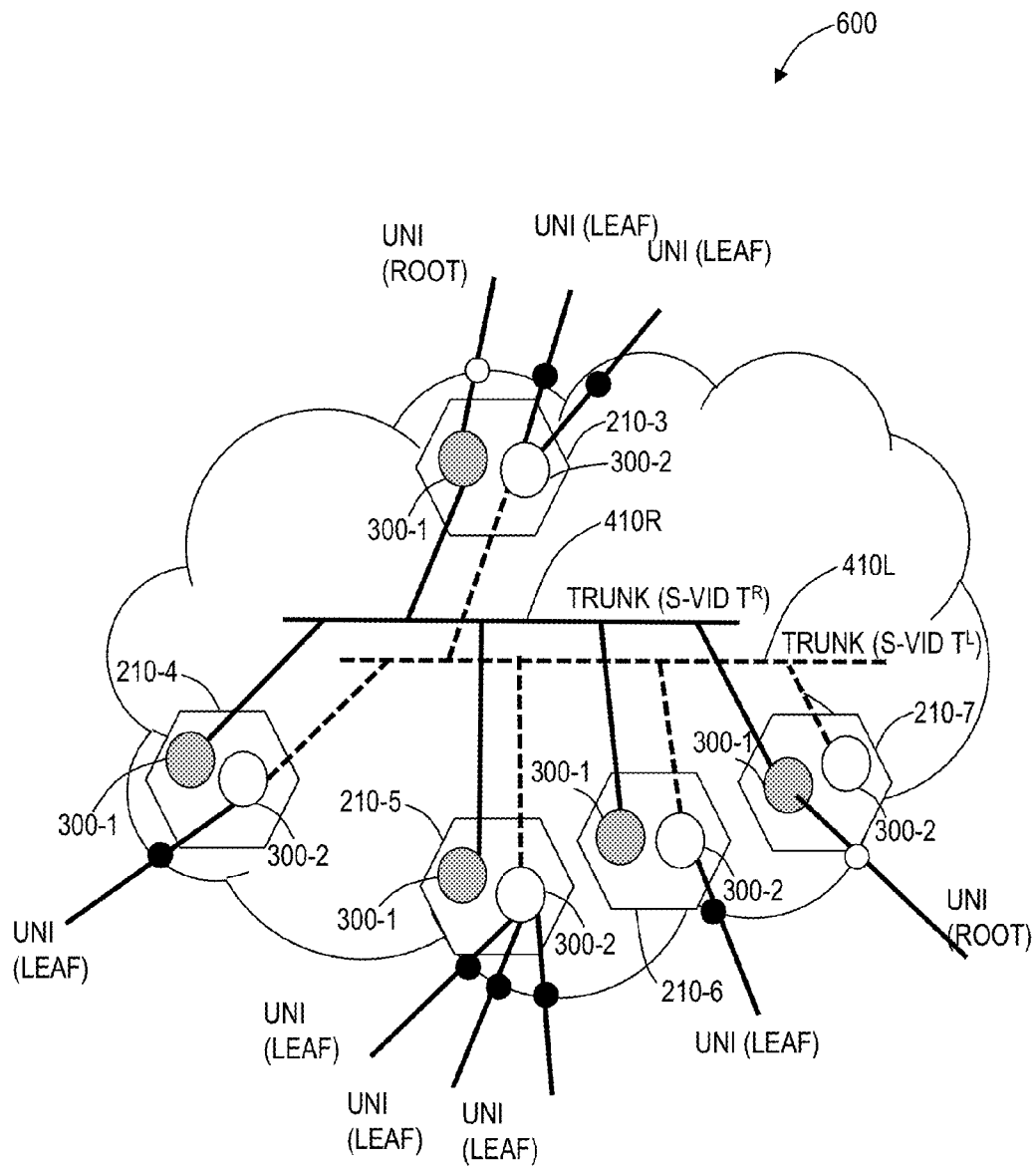
FIG. 6 is a network diagram of an Ethernet network of multiple virtual switches instantiating an E-Tree service thereon.
Figure 7:
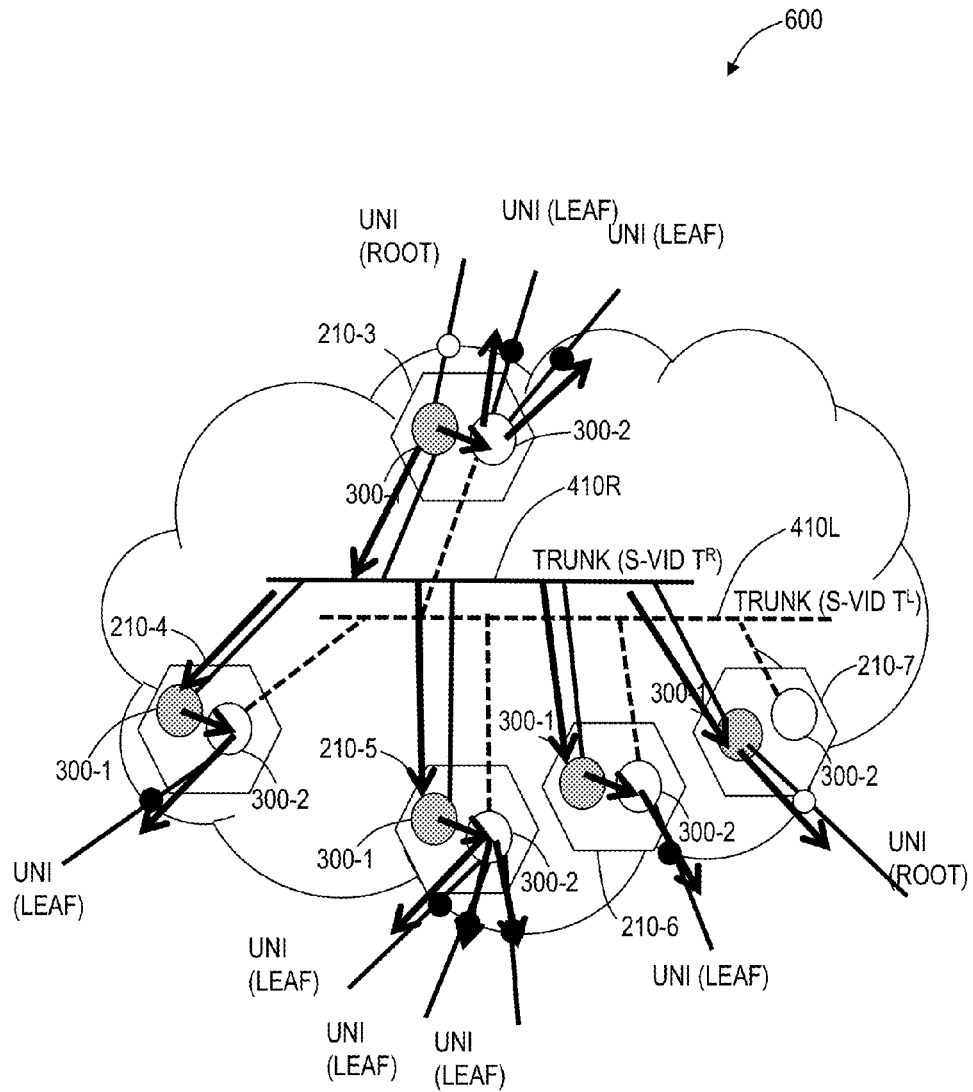
FIG. 7 is a network diagram of the Ethernet network of FIG. 6 showing an exemplary packet from a source address (SA) of a Root UNI port.
Figure 8:
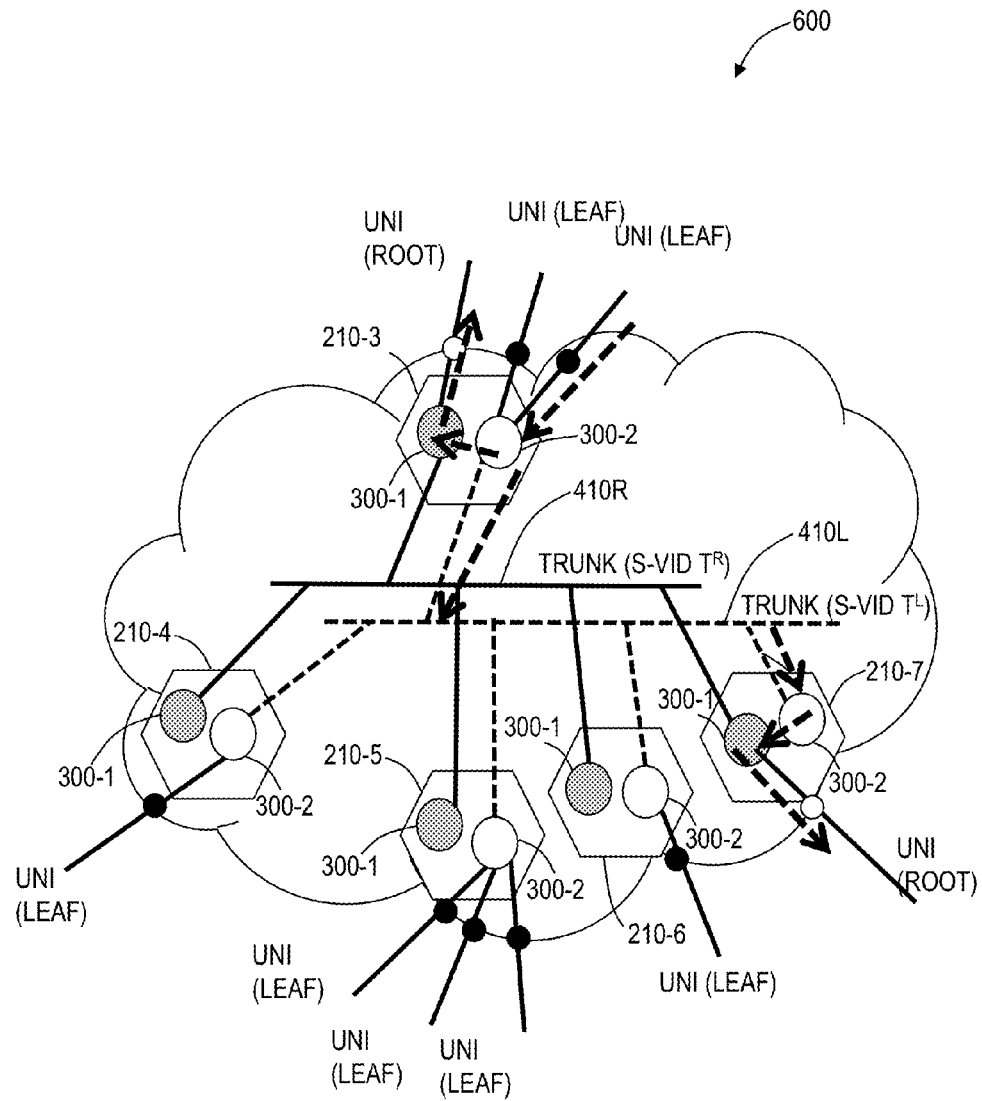
FIG. 8 is a network diagram of the Ethernet network of FIG. 6 showing an exemplary packet from a source address (SA) of a Leaf UNI port.

Referring to FIGS. 6-8, in exemplary embodiments, network diagrams illustrate an Ethernet network 600 of multiple virtual switches 210-3, 210-4, 210-5, 210-6, 210-7 instantiating an E-Tree service thereon. FIG. 6 illustrates the general topology of the Ethernet network 600, FIG. 7 illustrates the Ethernet network 600 showing an exemplary packet from a source address (SA) of a Root UNI port, and FIG. 8 illustrates the Ethernet network 600 showing an exemplary packet from a source address (SA) of a Leaf UNI port. The Ethernet network 600 includes the multiple virtual switches 210-3, 210-4, 210-5, 210-6 interconnected via the trunk VLAN, $T^R$, 410R and the branch VLAN, $T^L$, 410L. Note, as described in FIG. 2, the multiple virtual switches 210-3, 210-4, 210-5, 210-6 can be on same or separate nodes. The trunk VLAN, $T^R$, 410R and the branch VLAN, $T^L$, 410L communicate over NNI ports.

FIG. 7 illustrates a packet from the Root UNI port associated with the virtual switch 210-3. The PFG 300-1 of the virtual switch 210-3 send the packet to the PFG 300-2 of the virtual switch 210-3 where it egresses all Leaf UNI ports associated therewith. The PFG 300-1 also sends the packet on the trunk VLAN, $T^R$, 410R which provides the packet to each of the virtual switches 210-4, 210-5, 210-6, 210-7 via their associated PFG 300-1. The associated PFG 300-1 at each of the virtual switches 210-4, 210-5, 210-6, 210-7 performs the same functionality as the PFG 300-1 of the virtual switch 210-3, namely egressing the packet to any Root UNI ports on the associated PFGs 300-1 and sending to the corresponding PFGs 300-2 for egressing the packet to any Leaf UNI ports on the corresponding PFGs 300-2.

FIG. 8 illustrates a packet from one of the Leaf UNI ports associated with the virtual switch 210-3. The PFG 300-2 of the virtual switch 210-3 sends the packet to the PFG 300-1 of the virtual switch 210-3 where it egresses all Root UNI ports associated therewith. The PFG 300-2 of the virtual switch 210-3 also sends the packet on the branch VLAN, $T^L$, 410L where it is just sent to the virtual switch 210-7 which is the only other virtual switch with Root UNI ports. At the virtual switch 210-7, the PFG 300-2 receives the packet from the VLAN 410 and sends the packet to the PFG 300-1 where it egresses the Root UNI port at the virtual switch 210-7.

In an exemplary embodiment, assume the network 600 has much less Root UNI ports than Leaf UNI ports, i.e. # of CEs as Roots <<# of CEs as Leaves. Further, assume each customer equipment (CE) at the Root UNIs has a known MAC address. On the NNI ports, the network 600 can use the ACLs (i.e., on a per sub-port/S-VID basis) with the source address (SA) of the CEs at the Root UNIs.

From an interoperability perspective, the network 600 can use the two S-VID model, i.e. the VLANs 410L, 410R, to communicate traffic between Root and Leaf UNIs. Other platforms which do not use Private Forwarding Groups can use the IEEE 802.1Q model of configuring members of Trunk/Branch VLANs locally for delivery of packets to the correct UNIs.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. An Ethernet switch, comprising:
a virtual switch on a physical switch, wherein the virtual switch logically partitions the physical switch into separate switching domains, and wherein the virtual switch forwards traffic independently of other virtual switches on the physical switch; and
an Ethernet Tree (E-Tree) service instantiated via the virtual switch through a first private forwarding group and a second private forwarding group, wherein each of the first private forwarding group and the second private forwarding group includes a set of group-based associations and forwarding rules among logical interfaces of the virtual switch, wherein the E-Tree service utilizes three general categories of forwarding rules including private forwarding group-based rules, Virtual Local Area Network (VLAN)-based rules, and Access Control List (ACL)-based rules;
wherein Root User-Network Interface (UNI) ports are associated with the first private forwarding group and Leaf UNI ports are associated with the second private forwarding group;
wherein the first private forwarding group is configured to forward packets received on any of the Root UNI ports to any other Root UNI ports connected to the first private forwarding group and to the second private forwarding group for forwarding to any Leaf UNI ports connected to the second private forwarding group; and
wherein the second private forwarding group is configured to forward packets on any of the Leaf UNI ports to the first private forwarding group for forwarding to any Root UNI ports connected to the first private forwarding group.

2. The Ethernet switch of claim 1, further comprising:
a Network-Network Interface (NNI) port connected to the virtual switch;
a Root Virtual Local Area Network (VLAN) on the NNI port connected to the first private forwarding group; and
a Leaf VLAN on the NNI port connected to the second private forwarding group.

3. The Ethernet switch of claim 2, wherein the first private forwarding group is configured to forward packets received on any of the Root UNI ports to the Root VLAN on the NNI port; and
wherein the second private forwarding group is configured to forward packets received on any of the Leaf UNI ports to the Leaf VLAN.

4. The Ethernet switch of claim 2, wherein the first private forwarding group is configured to forward packets received on the Root VLAN to any of the Root UNI ports and to the second private forwarding group for forwarding to any of the Leaf UNI ports connected to the second private forwarding group; and
wherein the second private forwarding group is configured to forward packets received on the Leaf VLAN to the first private forwarding group for forwarding to any of the Root UNI ports.

5. The Ethernet switch of claim 2, further comprising:
an Access Control List for the NNI port associated with each of the Root VLAN and the Leaf VLAN;
wherein, based on the Access Control List, the Root VLAN allows a packet if its associated source address is of customer equipment at a Root UNI.

6. The Ethernet switch of claim 5, wherein, based on the Access Control List, the Leaf VLAN denies a packet if it's associated source address is of customer equipment at a Root UNI.

7. The Ethernet switch of claim 2, wherein the virtual switch is configured for one of shared VLAN learning and control plane techniques for establishing forwarding tables on each of the Root VLAN and the Leaf VLAN.

8. The Ethernet switch of claim 2, wherein the virtual switch is configured to:
push a Service VLAN identifier of the Root VLAN on a packet when the packet is ingressing at a Root UNI port;
push a Service VLAN identifier of the Leaf VLAN on a packet when the packet is ingressing at a Leaf UNI port;
pop a Service VLAN identifier of the Root VLAN or the Leaf VLAN on a packet when the packet is egressing at a Root UNI port; and
pop a Service VLAN identifier of the Root VLAN on a packet when the packet is egressing at a Leaf UNI port.

9. The Ethernet switch of claim 2, wherein the virtual switch is configured to:
communicate with a second Ethernet switch via the Root VLAN and the Leaf VLAN, wherein the second Ethernet switch operates the E-Tree service in accordance with IEEE 802.1Q-2011.

10. The Ethernet switch of claim 1, wherein the first private forwarding group and the second private forwarding group are each implemented in hardware of the physical switch via network processor code.

11. The Ethernet switch of claim 1, further comprising:
at least two of the Root UNI ports are located on different hardware in the Ethernet switch but commonly attached to the first private forwarding group.

12. An Ethernet network, comprising:
an Ethernet Tree (E-Tree) service;
a plurality of virtual switches interconnected to one another via Network-Network Interface (NNI) ports, wherein each of the plurality of virtual switches logically partitions a physical switch into separate switching domains, wherein each of the plurality of virtual switches forwards traffic independently of other virtual switches on the physical switch, wherein each of the plurality of virtual switches comprises a first private forwarding group and a second private forwarding group, and wherein each of the first private forwarding group and the second private forwarding group utilizes a set of group-based associations and forwarding rules;
at least one Root User-Network Interface (UNI) port connected to the first private forwarding group of one of the plurality of virtual switches belonging to a particular service instance; and
at least one Leaf UNI port connected to the second private forwarding group of one of the plurality of virtual switches belonging to the particular service instance;
wherein the first private forwarding group is configured to forward packets received on any of the at least one Root UNI ports to any other Root UNI port connected to the first private forwarding group and to the associated second private forwarding group for forwarding to any Leaf UNI ports connected to the second private forwarding group;
wherein the second private forwarding group is configured to forward packets received on any of the at least one Leaf UNI ports to the associated first private forwarding group for forwarding to any Root UNI ports connected to the first private forwarding group; and
wherein the E-Tree service utilizes three general categories of forwarding rules including private forwarding group-based rules, Virtual Local Area Network (VLAN)-based rules, and Access Control List (ACL)-based rules.

13. The Ethernet network of claim 12, further comprising:
a Root Virtual Local Area Network (VLAN) connecting the first private forwarding groups of each of the plurality of switches therebetween; and
a Leaf VLAN connecting the second private forwarding groups of each of the plurality of switches therebetween.

14. The Ethernet network of claim 13, wherein, for each of the plurality of virtual switches, the first private forwarding group is configured to forward packets received on any Root UNI port to the Root VLAN; and
wherein, for each of the plurality of virtual switches, the second private forwarding group is configured to forward packets received on any Leaf UNI port to the Leaf VLAN.

15. The Ethernet network of claim 13, wherein, for each of the plurality of virtual switches, the first private forwarding group is configured to forward packets received on the Root VLAN to any Root UNI port connected thereto and to the associated second private forwarding group for forwarding to any Leaf UNI port connected to the associated second private forwarding group; and
wherein, for each of the plurality of virtual switches, the second private forwarding group is configured to forward packets received on the Leaf VLAN to the associated first private forwarding group for forwarding to any Root UNI ports connected thereto.

16. The Ethernet network of claim 13, further comprising:
an Access Control List associated with each of the Root VLAN and the Leaf VLAN;
wherein, based on the Access Control List, the Root VLAN allows a packet if its associated source address is of customer equipment at a Root UNI; and
wherein, based on the Access Control List, the Leaf VLAN denies a packet if its associated source address is of customer equipment at a Root UNI.

17. The Ethernet network of claim 13, wherein each of the plurality of virtual switches is configured for shared VLAN learning and control plane techniques for establishing forwarding tables on each of the Root VLAN and the Leaf VLAN.

18. The Ethernet network of claim 13, wherein each of the plurality of virtual switches is configured to:
push a Service VLAN identifier of the Root VLAN on a packet when the packet is ingressing at a Root UNI port;
push a Service VLAN identifier of the Leaf VLAN on a packet when the packet is ingressing at a Leaf UNI port;
pop a Service VLAN identifier of the Root VLAN or the Leaf VLAN on a packet when the packet is egressing at a Root UNI port; and
pop a Service VLAN identifier of the Root VLAN on a packet when the packet is egressing at a Leaf UNI port.

19. The Ethernet network of claim 13, further comprising:
an Ethernet node communicatively coupled to the plurality of virtual switches via the Root VLAN and the Leaf VLAN, wherein the Ethernet node operates the E-Tree service in accordance with IEEE 802.1Q-2011.

20. A method, comprising:
receiving a first packet from a Root User-Network Interface (UNI) port at a first private forwarding group of a virtual switch;
sending the first packet to any additional Root UNI port coupled to the first private forwarding group and to a second private forwarding group;
sending the first packet from the second private forwarding group to any Leaf UNI port coupled to the second private forwarding group;
sending the first packet to a Root Virtual Local Area Network (VLAN);
receiving a second packet from a Leaf UNI port at the second private forwarding group of the virtual switch;
sending the second packet from the second private forwarding group to the first private forwarding group;
sending the second packet from the first private forwarding group to the Root UNI port and to the any additional Root UNI ports coupled to the first private forwarding group; and
sending the second packet to a Leaf VLAN;
wherein the virtual switch logically partitions a physical switch into separate switching domains, wherein the virtual switch forwards traffic independently of other virtual switches on the physical switch; and
wherein the virtual switch operates in a network including an E-Tree service that utilizes three general categories of forwarding rules including private forwarding group-based rules, Virtual Local Area Network (VLAN)-based rules, and Access Control List (ACL)-based rules.

* * * * *